(12) United States Patent
Mendiola

(10) Patent No.: US 8,233,601 B2
(45) Date of Patent: Jul. 31, 2012

(54) INTERRUPT PAYMENT SYSTEM

(75) Inventor: Dennis Mendiola, New York, NY (US)

(73) Assignee: VOXP Pte. Ltd., Singapore (SG)

( * ) Notice: Subject to any disclaimer, the term of this patent is extended or adjusted under 35 U.S.C. 154(b) by 1160 days.

(21) Appl. No.: 11/956,304

(22) Filed: Dec. 13, 2007

(65) Prior Publication Data
US 2008/0152107 A1    Jun. 26, 2008

(30) Foreign Application Priority Data
Dec. 14, 2006  (SG) ................. 200608702-7

(51) Int. Cl.
*H04M 15/00* (2006.01)
*H04M 3/42* (2006.01)

(52) U.S. Cl. ............. 379/114.22; 235/380; 379/88.08; 379/114.01; 379/121.02; 379/145; 379/210.01; 455/408; 455/414.1; 705/35; 705/75

(58) Field of Classification Search ............ 235/380; 379/114.01, 114.02, 114.05, 114.13, 114.21, 379/114.22, 114.27, 121.02, 121.05, 188, 379/265.09, 88.08, 145, 210.01, 211.02; 455/408, 414.1; 705/35, 75
See application file for complete search history.

(56) References Cited

U.S. PATENT DOCUMENTS

| | | | | |
|---|---|---|---|---|
| 4,429,188 A | * | 1/1984 | Allen | 379/188 |
| 5,517,555 A | * | 5/1996 | Amadon et al. | 455/408 |
| 5,627,887 A | * | 5/1997 | Freedman | 379/114.21 |
| 5,744,787 A | * | 4/1998 | Teicher | 235/380 |
| 5,937,044 A | * | 8/1999 | Kim | 379/121.05 |
| 6,639,977 B1 | * | 10/2003 | Swope et al. | 379/114.21 |
| 6,639,978 B2 | * | 10/2003 | Draizin et al. | 379/114.21 |
| 7,042,992 B1 | * | 5/2006 | Falcone et al. | 379/114.21 |
| 7,158,621 B2 | * | 1/2007 | Bayne | 379/114.13 |
| 7,218,921 B2 | * | 5/2007 | Mendiola et al. | 455/414.1 |
| 7,698,182 B2 | * | 4/2010 | Falcone et al. | 705/35 |
| 7,961,858 B2 | * | 6/2011 | Polozola et al. | 379/114.21 |
| 2003/0002639 A1 | * | 1/2003 | Huie | 379/114.27 |
| 2003/0076940 A1 | * | 4/2003 | Manto | 379/114.05 |
| 2003/0112936 A1 | * | 6/2003 | Brown et al. | 379/121.02 |
| 2003/0200182 A1 | * | 10/2003 | Truitt et al. | 705/75 |
| 2006/0100966 A1 | | 5/2006 | Park | |
| 2008/0112558 A1 | * | 5/2008 | Mendiola | 379/265.09 |
| 2008/0152107 A1 | * | 6/2008 | Mendiola | 379/114.01 |

OTHER PUBLICATIONS

Written Opinion of the International Searching Authority and International Search Report, mailing date Feb. 22, 2008, for corresponding International Application No. PCT/SG2007/000426.
International Preliminary Report on Patentability, mailing date Oct. 31, 2008, for corresponding International Application No. PCT/SG2007/000426.

* cited by examiner

*Primary Examiner* — Gerald Gauthier
(74) *Attorney, Agent, or Firm* — Intellectual Property Law Group LLP

(57) ABSTRACT

An interrupt payment system (100) comprising means (100) for detecting an interrupt signal generated by a party to a call; means (102) for obtaining details of a payment to be made on detection of an interrupt signal; a payment processor (104) operable to process the payment in accordance with the obtained details (104); and means (100) for resuming the call between all parties concerned on processing of a payment by the payment processor (104).

27 Claims, 5 Drawing Sheets

FIGURE 2

- SP Registration (34a)
- Service Providers (34b)
- Caller Registration (34c)
- Home Registration Form (36)

Name:

Address:

Email:

Contact Numbers:

Call Charge:

Bank Account:

[Next]

FIGURE 3

- SP Registration (34a)
- Service Providers (34b)
- Caller Registration (34c)
- Home (38)

Alias:

Call Types:

Expertise:

Call Times:

[Next] (40)

INTERRUPT PAYMENT SYSTEM

FIELD OF THE INVENTION

The invention relates to an interrupt payment system. The invention is particularly suited to allow either a customer or a service provider to interrupt a telecommunication call and access a system whereby payment may be made by the customer to the service provider.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

The amount a service provider charges for certain services is often dependent on a range of factors. However, clients of such service providers wish to have an indication of the costs prior to engaging the service provider to provide such services. This conundrum is often resolved by the client and the service provider meeting face to face such that the service provider may put questions to the client aimed at eliciting the information required by the service provider to provide a reasonably accurate indication of costs for providing the requested service(s). However, it is not always possible or practical for a face to face meeting to take place.

An alternative method of obtaining the required information is for the service provider to put the same set of questions to the client over a telecommunication link. While this allows the service provider to provide to the client a reasonably accurate indication of costs for providing the requested service(s), in situations where the service provider requests or requires advance payment for providing the requested service(s) the telecommunication link is often required to be terminated until such time as the advance payment has been made and confirmed as received by the service provider. Once the advance payment has been made and confirmed as received by the service provider, the service provider or client must establish a further telecommunication link to handle the provision of the service by the service provider.

In such a situation, the client may become less enthusiastic about the service and never follow up with payment or may be frustrated by the delay required in obtaining the service resulting from the above system to the point that another service provider is engaged to provide the service. In either situation, the service provider has lost the sale.

It is therefore an object of the present invention to provide a payment system that can be activated at any time during a telecommunication link to facilitate payment from a client to a service provider without the need to terminate the telecommunication link.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is an interrupt payment system comprising:

means for detecting an interrupt signal generated by a party to a call;

means for obtaining details of a payment to be made on detection of the interrupt signal;

a payment processor operable to process the payment in accordance with the obtained details; and means for resuming the call between all parties concerned on processing of the payment by the payment processor.

The system may also include, as part of the means for obtaining details of a payment to be made to another party, a voice response system to guide the party who generated the interrupt signal through the process of making payment to another party to the voice call. Ideally, the voice response system is operable to confirm processing of payment to the party who generated the interrupt signal and operable to confirm receipt of payment to the other party to the call to whom payment has been made.

The system may also include confirmatory means to confirm with the party making the payment that the payment details are correct for processing.

In one optional configuration, the party that generated the interrupt payment signal is the party to whom payment is to be made.

The call may be one of the following: a telephone call; a video call having voice capabilities; a voice-over-internet protocol call; or website or computer program initiated voice call.

The system may be implemented in conjunction with a call-centre system having payment details recorded for the party making the payment and the party to whom the payment is to be made. In this situation, the means for obtaining payment details of a payment to be made operable to obtain these details and pass them to the payment processor to facilitate payment.

In a preferred embodiment, the party making payment receives a service, in whole or in part, or instructions on how to access a service, following resumption of the call.

The payment received by the party to whom payment is made may be reduced by a commission payable to a system operator, and the amount represented by such commission is paid to the system operator.

In accordance with a second aspect of the present invention there is a method of making a payment comprising the steps of:

detecting an interrupt signal generated by a party to the call;

obtaining details of a payment to be made on detection of the interrupt signal;

processing the payment in accordance with the obtained details; and resuming the call between all parties concerned on processing of the payment.

The method may further comprise the step of confirming processing of the payment to the party who generated the interrupt signal and confirming receipt of payment to the other party to the call to whom payment has been made.

Additionally, the step of obtaining details of a payment to be made on detection of the interrupt signal may include the sub-step of obtaining at least part of the details of payment from a call centre system having payment details recorded for the party making the payment and the party to whom the payment is to be made.

Again, it is preferable that the method also include the step of delivering a service, at least in part, by way of the call on resumption of the call.

In accordance with a third aspect of the invention there is an interrupt payment server comprising:

means for detecting an interrupt signal generated by a party to a call;

means for obtaining details of a payment to be made on detection of the interrupt signal;

a payment processor operable to process the payment in accordance with the obtained details; and means for resuming the call between all parties concerned on processing of a payment by the payment processor.

In an alternate configuration of the interrupt payment server, the means for obtaining details of a payment to be made to another party includes a voice response system to guide the party who generated the interrupt signal through the process of making payment to another party to the voice call. Preferably, the voice response system is operable to confirm processing of payment to the party who generated the interrupt signal and operable to confirm receipt of payment to the other party to the call to whom payment has been made.

The interrupt payment server may be further modified to include confirmatory means to confirm with the party making the payment that the payment details are correct for processing.

The interrupt payment system may also be adapted for use with a call centre system, the call centre system having payment details recorded for the party making the payment and the party to whom the payment is to be made, the means for obtaining details of a payment to be made operable to obtain these details and pass them to the payment processor to facilitate payment.

Preferably, the interrupt payment system also includes service delivery means to deliver a service, at least in part, by way of the call on resumption of the call.

In accordance with a fourth aspect of the present invention there is a computer-readable medium having software recorded thereon, the software on execution operable to:

detect an interrupt signal generated by a party to a call;

obtain details of a payment to be made on detection of the interrupt signal;

process the payment in accordance with the obtained details; and resume the call between all parties concerned on processing of a payment by the payment processor.

BRIEF DESCRIPTION OF THE DRAWINGS

The invention will now be described, by way of example only, with reference to the accompanying drawings, in which:

FIG. 2 is a first screen shot of a website that forms part of the unified call centre system shown in FIG. 1.

FIG. 3 is a second screen shot of a website that forms part of the unified call centre system shown in FIG. 1.

PREFERRED EMBODIMENTS OF THE INVENTION

Figure 1:
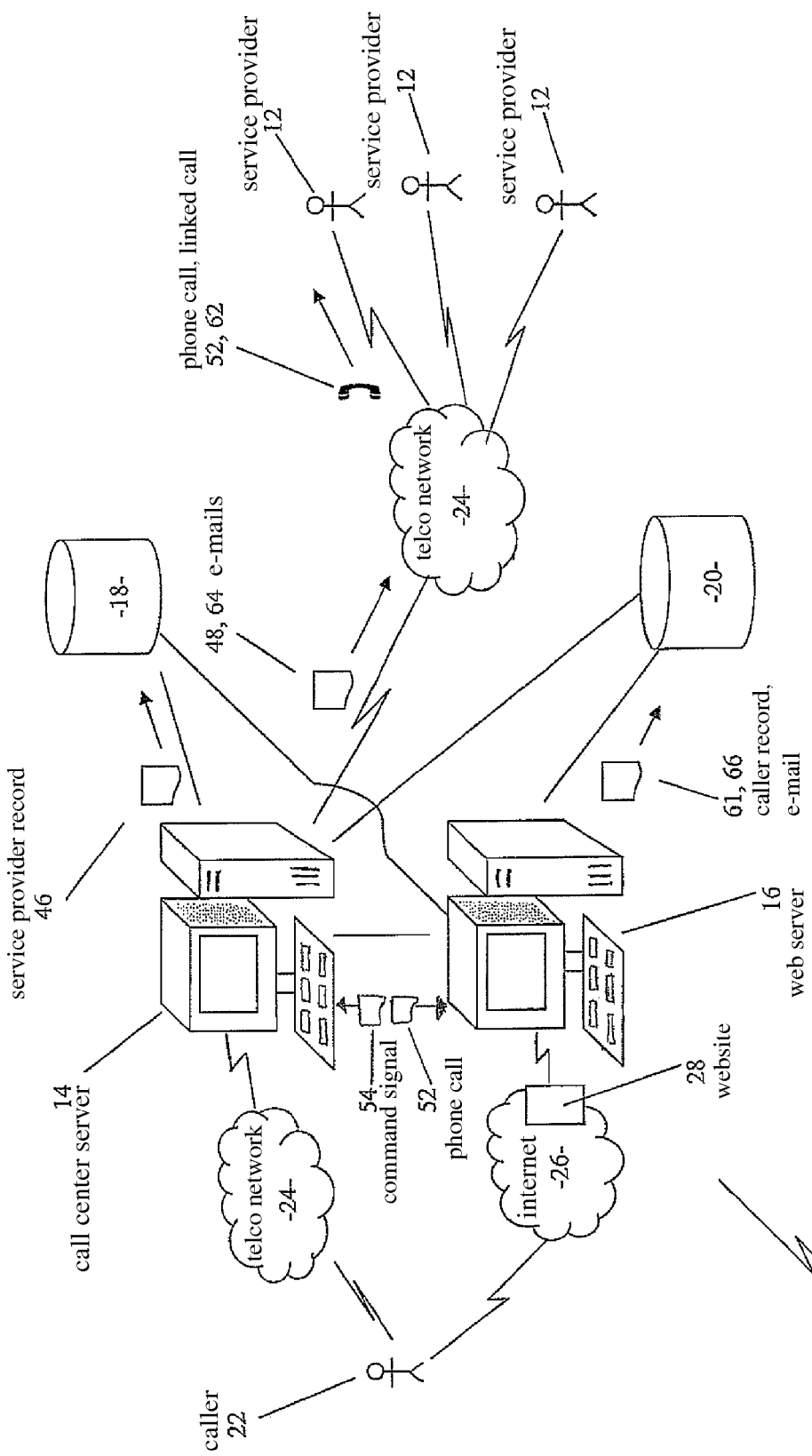
FIG. 1 is a schematic representation of a call centre system 10 to which an interrupt payment system in accordance with the present invention is in communication.
Figure 4:
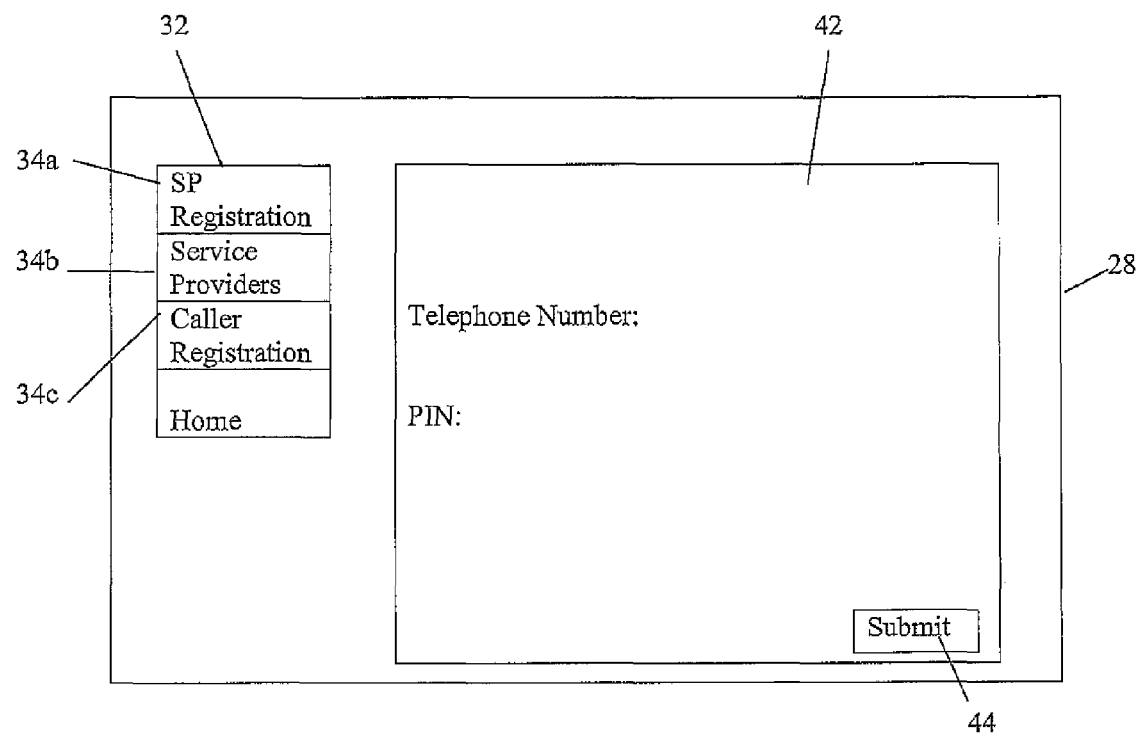
FIG. 4 is a third screen shot of a website that forms part of the unified call centre system shown in FIG. 1.
Figure 5:
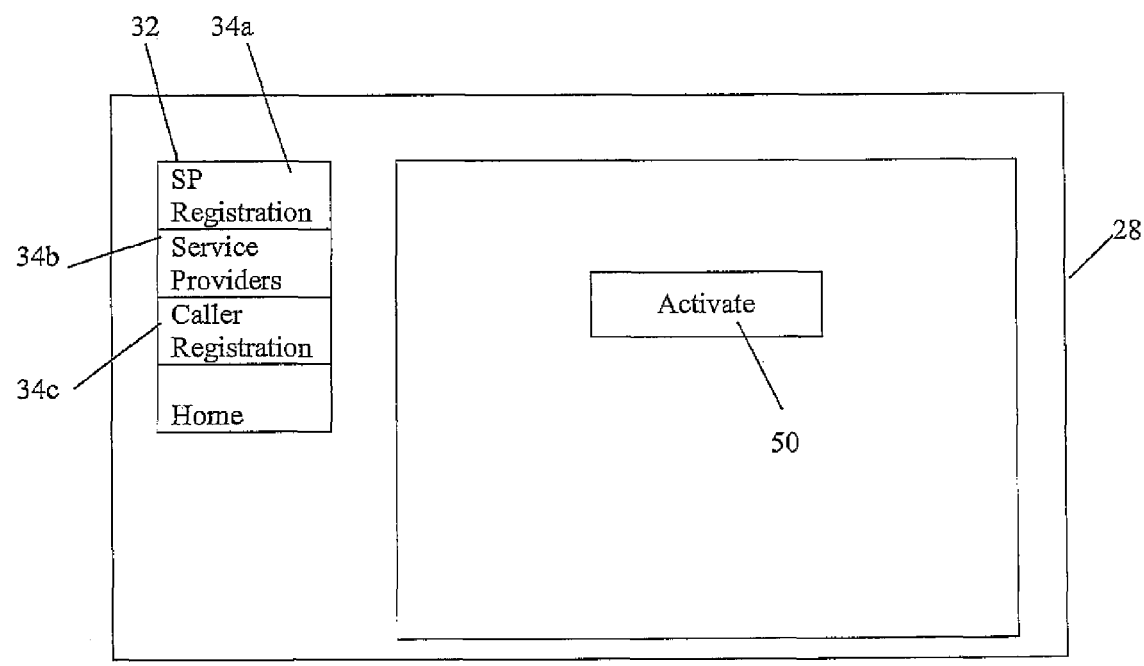
FIG. 5 is a fourth screen shot of a website that forms part of the unified call centre system shown in FIG. 1.
Figure 6:
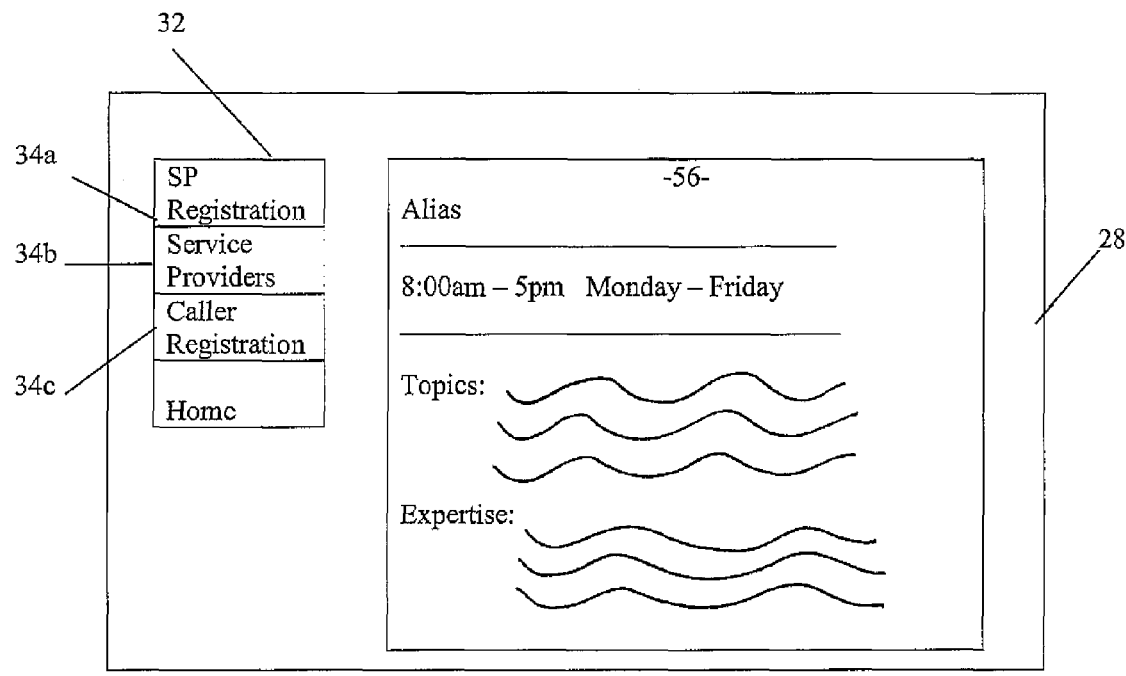
FIG. 6 is a fifth screen shot of a website that forms part of the unified call centre system shown in FIG. 1.
Figure 7:
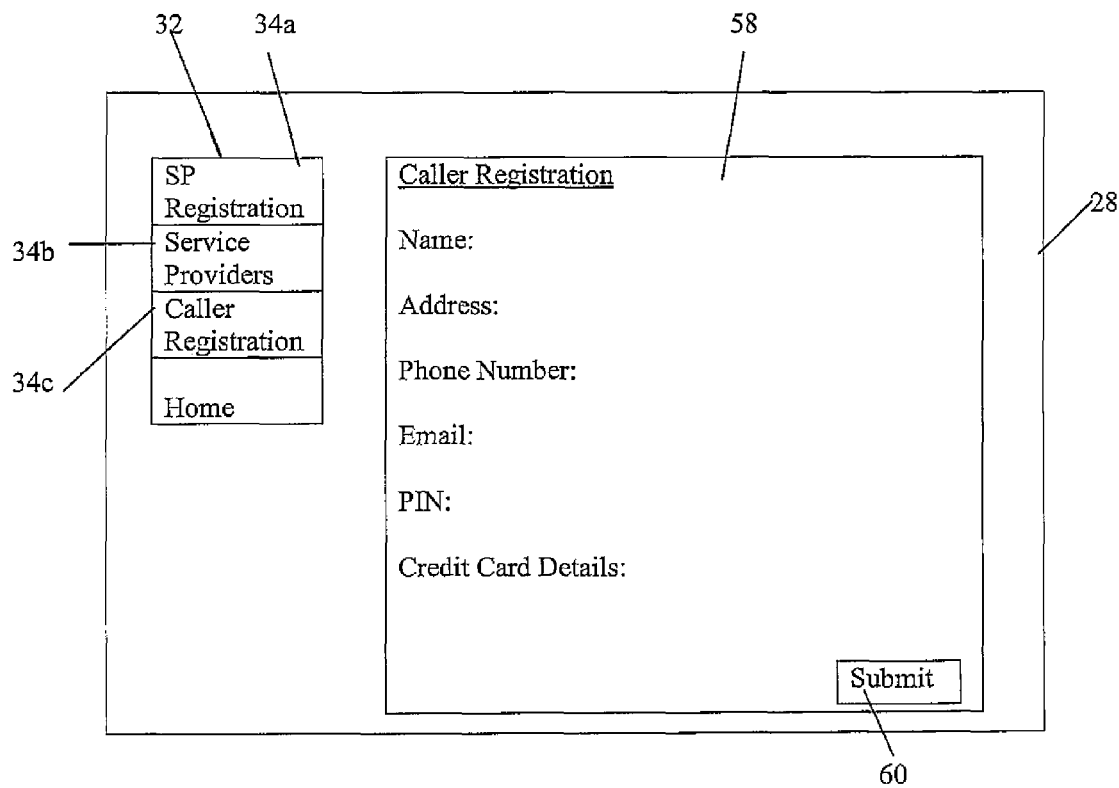
FIG. 7 is a sixth screen shot of a website that forms part of the unified call centre system shown in FIG. 1.
Figure 8:
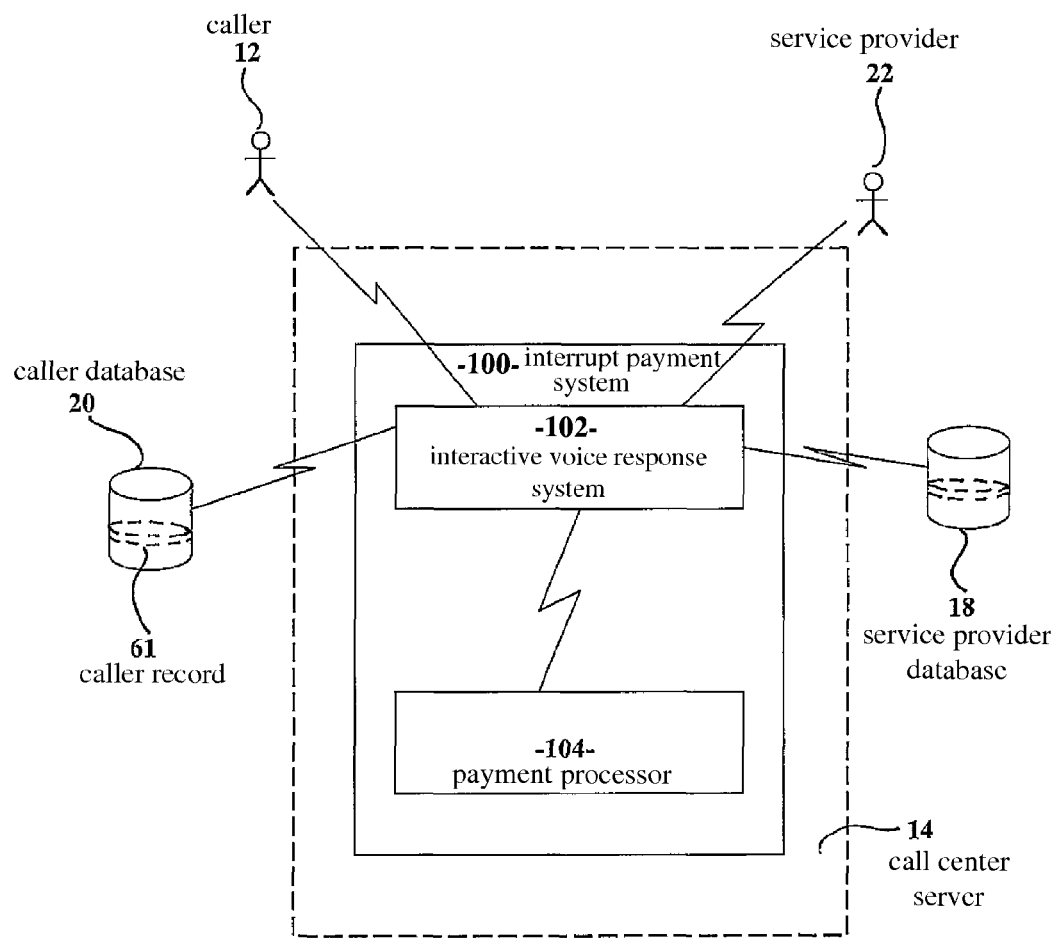
FIG. 8 is a schematic representative of the interrupt payment system according to the present invention.

In accordance with a first embodiment of the invention there is an interrupt payment system 100 for a unified call centre system 10 for multiple service providers 12. The unified call centre system 10 comprises:

a call centre server 14;

a web server 16;

a service provider database 18; and a caller database 20.

The call centre server 14 is able to communicate with service providers 12 and callers 22 through at least one telecommunication network 24. The call centre server 14 is also in direct communication with the web server 16, the service provider database 18 and the caller database 20.

In addition to being in direct communication with the call centre server 14, the web server 16 is in direct communication with both the service provider database 18 and the caller database 20.

The web server 16 is able to communicate with callers 22 through the internet 26. To facilitate this communication the web server 16 operates a website 28.

The interrupt payment system 100 exists as software stored and executable on the call centre server 14. The interrupt payment system 100 includes an interactive voice response system 102 and a payment processor 104.

The invention will now be described in the context of its intended use.

A service provider 12 initiates a web-browser program to connect to the internet. Through the internet connection, the service provider 12 accesses the website 28.

The website 28 presents the service provider 12 with a menu of options 32. By selecting the "SP Registration" icon 34a from the menu of options 32, the service provider 12 can register to provide services through the call centre system 10. In this case, after selecting the "SP Registration" icon 34a, the website 28 changes to display a registration form 36 to the service provider 12.

The registration form 36 requires the service provider 12 to provide at least the following information:

their legal name;

their street address;

their e-mail address. The significance of this will become apparent later.

at least one contact number. The contact number may be the telephone number of a mobile telephone or a fixed line telephone in the service provider's 12 possession. Where more than one contact number is given, the service provider 12 must designate one of the contact numbers as their primary contact number.

the amount they wish to charge per call received. This may be a fixed charge to the caller 22 or it may be calculated on a pro rata basis.

their bank account information. This information is required to credit the service provider 12 with a portion of the payment received from their callers 22.

Once the service provider 12 has entered in the above mandatory information, the website 28 changes to display a "blog" form 38 to the service provider 12. The "blog" form 38 requests the service provider 12 to enter in additional optional information which will be used by the web server 16 to provide information to callers 22 about the service provider 12 and by the call centre server 14 to screen calls made to the service provider 12. This information includes:

Alias. This is the name or "personality" to be adopted by the service provider 12 when providing services through the call centre system 10. If the service provider 12 does not provide an alias, the call centre system 10 will operate on the presumption that the service provider 12 wishes to use their legal name when providing services through the call centre system 10.

Call Types. In this section the service provider 12 provides a description of the types of calls and topics he/she is willing to answer from callers 22. This may be a written description authored by the service provider 12 themselves. More common call types and topics may be added by selection from a drop down list.

Expertise. The service provider 12 provides a summary résumé of his/her experience and other information to assist the caller 22 in determining whether the service provider 12 is the person they should be speaking too via the call centre system 10.

Call Times. Here the service provider 12 specifies the time periods they are available to take calls. The time periods may differ depending on the day of the week.

Once the service provider 12 has entered in as much of the above optional information as they desire to do so, they activate action button 40. On activation of the action button 40, the website 28 changes to display a final registration form 42.

The final registration form 42 requests the service provider 12 to enter in a telephone number and a personal identification number (PIN). By selecting a check box (not shown), the service provider 12 can automatically fill in the telephone number details with their primary contact number (as entered in the registration form 36). Registration is then finalised by activating the submit action button 44.

On activation of the submit action button 44, the web server 16 compiles all of the entered information received from the service provider 12 into a service provider record 46. The service provider record 46 is then communicated to the service provider database 18 for storage and future reference.

At the same time, the web server 16 generates an e-mail 48 with the information that forms the service provider record (in an appropriately formatted fashion for ease of reference). Appended to the e-mail 48 is also a unique identifier generated by the web server 16 and instructions on how to activate their account and the URL of that portion of the website 28 that allows for activation of accounts. The e-mail 48 is then sent to the service provider 12 by way of the e-mail address they entered in the registration form 36.

Upon receiving the e-mail 48, the service provider 12 checks the information they have entered to confirm that it is correct. Once so confirmed, the service provider 12 clicks on the URL provided in the e-mail 48 to access that portion of the website 28 that allows for activation of accounts. Activation can then be finalised, from a service provider 12 perspective, by activating the activate action button 50.

Activation of the activate action button 50 causes the web server 16 to send a control signal to the call centre server 14 to initiate a call 52 to the service providers 12 main contact number (again, as entered in the registration form 36).

As part of the process of initiating the call 52 to the service provider's 12 main contact number, the service provider 12 is provided with an automated voice message as follows:

"Hello [Service Provider]. We are finalizing your membership. Please enter your PIN followed by the # sign."

Where, in this message, the phrase [Service Provider] is replaced with the service provider's 12 alias, if provided. If no alias is provided, the phrase [Service Provider] is replaced with the service provider's 12 legal name.

Following announcement of the automated voice message, the service provider 12 enters into their telephone the PIN that they designated in the final registration form 42.

Using techniques as would be known to the person skilled in the art, the call centre server 14 translates the DTMF signals generated by the service provider 12 in entering their PIN into a numerical value. The call centre server 14 then sends a command signal 52 back to the web server 16 which includes the numerical value and the phone number of the service provider 12 called. The web server 16 then cross-references the command signal 52 values with those stored in the service provider database 18. If a match is found the corresponding service provider record 46, as stored in the service provider database 18, is designated as active. At the same time, the web server 16 sends a return command signal 54 to the call centre server 14 instructing the call centre server 14 to inform the service provider 12 that their account with the call centre system 10 is now active.

On designating a service provider record 46 as active, the web server 16 operates to generate a template personal information page 56 for the service provider 12.

A caller 22 wishing to access the services provided by a service provider 12 registered with the call centre system 10 then accesses the website 28 through their own web browser (not shown). By selecting the "Service Providers" icon 34*b* from the menu of options 32, the caller 22 may browse the personal information pages 56 of the various service providers 12—each generated from the service provider's template personal information page 56. Alternatively, the caller 22 may seek information in respect of a particular service provider 12 by entering in the service provider's 12 alias (or real name if no alias) in the search box provided (not shown). On matching the entered text with the alias or real name of an activated service provider 12, the website 28 changes to display the personal information page 56 of that service provider, as generated from the service provider's 12 template personal information page 56.

Regardless, in each case the service provider's 12 generated personal information page 56 also includes their unique identifier (as communicated to the service provider 12 by way of e-mail 48).

Upon determining the service provider 12 that the caller 22 wishes to call, the caller 22 records the unique identifier as stated on the service provider's 12 generated personal information page 56 and selects the "Caller Registration" icon 34*c* from the menu of options 32.

On selection of the "Caller Registration" icon 34*c*, the website 28 changes to display a caller registration form 58 to the caller 22. The caller registration form 58 requires the caller 12 to provide at least the following information:

their legal name;
their mailing address;
their phone number;
their e-mail address;
a personal PIN; and
their credit card details or other electronic payment facility, such as that provided by PayPal Inc. under the trade mark PayPal.

On completion of the caller registration form 58, the caller 22 establishes their account by activating the submit action button 60. On activation of the submit action button 60, the web server 16 collates the information entered as part of the caller registration form 58 into a caller record 61. The caller record 61 is then forwarded to the caller database 20 for storage and future reference.

With the caller 22 having an activated account with the call centre system 10, the caller 22 may now call any of the service providers 12 registered with the call centre system 10.

To do this, the caller 22 rings a dedicated phone line established for the call centre system 10. This connects the caller 22 to the call centre server 14. Upon connection, the call centre server 14 initiates execution of the interrupt payment system 100. In response to this initiation, the interrupt payment system 100 directs the interactive voice response system 102 to play to the caller 22 the following as an interactive voice recording:

"Hello [Caller]. Who would you like to speak to today? Please enter the person's unique identifier followed by the # sign"

Where, in this recording, the phrase [Caller] is replaced with the caller's 22 real name. The caller's 22 real name is identified by the interrupt payment system 100 by matching the phone number used to make the call (as determined by standard caller identification techniques) to phone numbers that form part of the caller records 61 stored in the caller database 20. The matched caller record 61 is also stored by the interrupt payment system 100 for future reference.

The caller 22 then enters the unique identifier of the service provider 12 they wish to contact. The unique identifier is processed in the same manner as the other PINs referred to above and the resulting number passed back to the interrupt payment system 100 for processing. The interrupt payment system 100 then verifies that the number entered by the caller 22 corresponds with a registered service provider 12. This is achieved by comparing the number entered by the caller 22 against the records stored in the service provider database 18. At the same time, the matching service provider recorder is also stored by the interrupt payment system 100 for future reference. The interrupt payment system 100 then communicates the number representing the service provider's unique identifier back to the call centre server 14 as verification that the unique identifier represents an actual service provider 12.

On receiving verification that the unique identifier entered corresponds with an actual service provider 12, the call centre server 14 checks to see whether the service provider 12 has set time periods during which they will accept calls. If so, and the call is made outside of these time periods, the caller 22 is played an interactive voice recording informing them of this fact and terminating the call. Otherwise, the call centre server 14 again passes control back to the interrupt payment system 100 which directs the interactive voice response system 102 to play the following voice message:

"We are connecting your call to [Service Provider]. You will be charged [Service Provider's Rate] for this call and charging begins when the call is picked up by [Service Provider]. To proceed with this call, please enter your PIN followed by the # symbol."

In this voice message, the phrase [Service Provider] is replaced with the alias or legal name of the service provider 12, as applicable. Similarly, the phrase [Service Provider's Rate] is replaced with the amount the service provider 12 wishes to charge per call received as recorded in the service provider's 12 corresponding record in the service provider database 18.

The caller 22 then enters their PIN which is processed as already described. The entered PIN is then cross-referenced by the interrupt payment system 100 with the PIN of the caller 22 as recorded in their stored caller record 61. If a match is found through this cross-reference, the interrupt payment system 100 directs the call centre server 16 to initiate a linking call 62 to the appropriate service provider 12 by way of their primary contact number.

In the event that the service provider 12 can not be contacted by way of their primary contact number, the call centre server 16 will terminate this initial linking call 62 and seek to establish, in turn, additional linking calls 62 to the other contact numbers the service provider 12 has recorded as part of their service provider record 46. If the service provider 12 does not answer on any of the contact numbers recorded as part of their service provider record 46, the caller 22 is put on hold and given an estimate as to how many minutes before their call is answered by the service provider 12 (where possible to do so).

However, if the service provider 12 is able to be contacted on any of their contact numbers, the call centre server 16 plays to the service provider 12 the following as an interactive voice recording:

"Hello [Service Provider]. [Caller] is trying to reach you. Please reply with your PIN followed by the # sign to take the call."

Where, in this recording, the phrase [Service Provider] is replaced with the alias or legal name of the service provider 12. In this manner, if the service provider 12 operates a number of accounts under different aliases, they are able to identify which alias the caller 22 is seeking to speak with. Similarly, the phrase [Caller] is replaced with the caller's 22 real name.

The service provider 12 then enters their PIN. The PIN is processed in the same manner as the other PINs referred to above. A validation check is then performed by the call centre server 16 to ensure that the PIN entered corresponds with the PIN of the service provider 12 the caller 22 wishes to speak with.

If the validation check is successful, the caller 22 is then patched through to the service provider by way of the linking call 62 At this point, the call centre server 14 starts timing the call and control of the linking call 62 is passed back to the interrupt payment system 100. This situation is maintained until the call is terminated by either the caller 22 or the service provider 12.

For the duration of the linking call 62 the interactive voice response system 102 listens for a predetermined set of DTMF signals being entered by the caller 22 to the linking call. On determination that the predetermined set of DTMF signals has been entered by the caller 22, the interactive voice response system 102 interrupts, but does not terminate, the linking call 62.

For the duration of this interruption, the service provider 12 is played a message informing them that the caller 22 is in the middle of processing a payment to them. At the same time, the caller 22 is played the following voice message:

"Hello [Caller]. Please enter the dollar amount you wish to pay to [Service Provider] followed by the # sign. For example, to pay $50, you must enter five zero hash."

Where, again, in this recording, the phrase [Service Provider] is replaced with the alias or legal name of the service provider 12 and the phase [Caller] is replaced with the callers 22 real name.

The interactive voice response system 102 then waits a predetermined period of time for a DTMF signal. If a DTMF signal is not received within the predetermined time period, the interactive voice response system 102 simply takes such action as necessary to resume the linking call 62.

Alternatively, if a DTMF signal is received within the predetermined time period, the interactive voice response system 102 operates to determine the number or symbol representative of the DTMF signal. If the number or symbol representative of the DTMF signal is a number or symbol other than the "#" symbol, the interactive voice response system 102 records the number or symbol in a temporary memory location and again waits the predetermined time period for an additional DTMF signal. This process repeats indefinitely until the number or symbol representative of the DTMF signal is the "#" symbol.

On receipt of a "#" symbol, the interactive voice response system 102 processes each number and/or symbol stored in the temporary memory location to determine the monetary amount represented by the DTMF signals entered by the caller 22. The interactive voice response system 102, then conveys the following message to the caller 22:

"You have entered [Monetary Amount]. To confirm payment please press 3. To change the amount to be paid please press 4."

Where, in this message, the phrase [Monetary Amount] is replaced with the monetary amount determined by the interactive voice response system 102 as previously entered by the caller 22.

The interactive voice response system 102 again waits a second predetermined time period for the caller 22 to send a DTMF signal. If the caller 22 does not send a DTMF signal during the second predetermined time period the last message played by the interactive voice response system 102 is replayed to the caller 22.

If the DTMF signal sent by the caller 22 is representative of the number "4", the interactive voice response system 102 repeats the process described above to obtain a monetary figure from the caller 22 using DTMF signals. However, if the DTMF signal sent by the caller 22 is representative of the number "3", the interactive voice system 102 plays to the caller 22 the following voice message:

"Please enter your 4-digit Phone PIN to confirm payment for the amount [Monetary Amount] to [Service Provider]."

Where, again, the phrase [Monetary Amount] is replaced with the monetary amount determined by the interactive voice response system 102 as previously entered by the caller 22 and the phrase [Service Provider] is replaced with the alias or legal name of the service provider 12 concerned.

The interactive voice response system 102 then awaits a series of four DTMF signals from the caller 22 representative of the caller's 22 personal PIN. After appropriate processing as described previously to convert DTMF signals into relevant information, the personal PIN as entered by the caller 22 is returned to the interrupt payment system 100 for verification. The interrupt payment system 100 verifies the entered personal PIN by comparing it to the personal PIN included in the matching caller 61 record stored previously by the interrupt payment system 100. Control is then passed back to the interactive voice response system 102 along with the results of verification.

If the personal PIN as entered by the caller 22 has not been verified by the interrupt payment system 100, the interactive voice message system 102 repeats the processing described in the last three paragraphs.

Control is then passed from the interactive voice response system 102 to the payment processor 104. Using the information contained in both the caller 22 and service provider 12 records stored by the interrupt payment system 100 the payment processor 104 is able to debit the confirmed monetary amount represented by the DTMF signals entered by the caller 22 from the caller's credit card or other electronic payment facility and credit that same amount (minus an appropriate commission or service fee) to the service provider's 12 bank account. As part of the transfer the payment processor 104 receives confirmatory signals indicating that payment has been properly debited and credited. On receipt of the confirmatory signal indicating that payment has been property debited, the payment processor 104 instructs the interactive voice response system 102 to issue the following voice message to the caller 22:

"You have paid [Monetary Amount] to [Service Provider]. You may now hang up. Alternatively, stay on the line and you will shortly be reconnected to [Service Provider]"

Again, the phrase [Monetary Amount] is replaced with the monetary amount determined by the interactive voice response system 102 as previously entered by the caller 22 and the phrase [Service Provider] is replaced with the alias or legal name of the service provider 12 concerned.

On receipt of the confirmatory signal indicating that payment has been property credited, the payment processor 104 instructs the interactive voice response system 102 to issue the following voice message to the service provider 12:

"You have been paid [Reduced Monetary Amount] by [Caller]. You may now hang up. Alternatively, stay on the line and you will shortly be reconnected to [Caller]"

In this message, the phrase [Reduced Monetary Amount] is replaced with the monetary amount determined by the interactive voice response system 102 as previously entered by the caller 22 minus the appropriate commission or service fee. Similarly, the phrase [Caller] is replaced with the legal name of the caller 22 concerned.

If neither the caller 22 or the service provider 12 has hung up in the meantime, the linking call 62 is resumed. The interactive voice response system 102 then resets itself so as to again listen for the predetermined set of DTMF signals being entered by the caller 22.

On termination of the linking call 62, the call centre server 14 generates two e-mail messages 64, 66. The first e-mail message 64 is sent to the service provider 12 and provides a summary of the call. This summary includes at least the following information:

the real name of the caller 22;
the alias, or real name if no alias, of the service provider 12;
the time and date of the call;
the duration of the call;
the rate for the call; and
the approximate earnings for that call, excluding payments processed by the interrupt payment system 100.

The second e-mail message 66 is sent to the caller 22 and also provides a summary of the call. This summary includes at least the following information:

the real name of the caller 22;
the alias, or real name if no alias, of the service provider 12;
the time and date of the call.
the duration of the call;
the rate for the call; and
the total cost of the call, excluding payments processed by the interrupt payment system 100.

After sending the second e-mail message 66, the call centre server 14 then operates to determine the cost of the call. This is achieved by multiplying the duration of the call by the cost per time period in the case of pro rata calls. The call centre server 14 then charges the total cost of the call against the credit card or electronic credit facility detailed by the caller 22 in their caller record 61.

In accordance with a second embodiment of the invention (not shown), where like numerals reference like parts, the first embodiment of the invention is supplemented with a feedback mechanism. The feedback mechanism activates upon termination of a call by the service provider 12. Once terminated, the caller 22 is redirected to the call centre server 14. The call centre server 14 then operates to play a feedback message to the caller 22. In response the caller 22 enters into their telephone the appropriate code representative of the feedback they wish to leave in respect of the service provider 12. Again, using techniques as would be apparent to the person skilled in the art, the call centre server 14 operates to convert the signal received representative of the feedback they wish to leave in respect of the service provider 12 to a more appropriate value. This value, and the service provider's 12 identity, is then sent to the web server 16 for association with the service provider record 46. This association takes the form of a record (not shown) storing a current tally of the various feedback values and the number of times a caller 22 has provided such a feedback value in respect of the associated service provider 12.

This record is also referenced each time the service provider's 12 information page 56 is generated from the template so that callers 22 may also view details of the feedback provided in respect of the service provider 12. In this manner, using the feedback provided as a reference, they may make an appropriate decision on the value of the service provider's 12 services before calling them through the call centre system 10.

In accordance with a third embodiment of the invention, where like numerals reference like parts, the interrupt payment system 100 has its processing modified. The modified processing allows the service provider 12, rather than the caller 22, to activate the interrupt payment system 100. On activation of the interrupt payment system 100, the service provider 12 is requested to enter in the payment amount they wish to receive from the caller 22 using DTMF techniques identical to those already described. At the same time, the caller 22 is informed that the service provider 12 has accessed the interrupt payment system 100 to request a payment for the provision of further service(s).

Once the service provider 12 has entered in the amount they wish to receive from the caller 22, the service provider 12 is played a message informing him/her that the amount entered is now being requested of the caller 22. At the same time, the caller 22, is requested to make a specific payment of the amount entered by the service provider 12. If the caller 22 agrees to make the specific payment, the caller is required to enter their personal PIN in the same manner as described in the first embodiment and processing continues as described in the first embodiment.

In a fourth embodiment of the invention, where like numerals reference like parts, the service provider 12 may be engaged to provide the same service simultaneously to a number of callers 22. For example, the service provider 12 may provide an audio performance.

In this instance each caller 22 will be required to make a payment to the service provider 12 through the interrupt payment system 100 at least prior to hearing the audio performance over the linked call 62. Additional payments made via the interrupt payment system 100 may be required by the service provider 12, for example, to extend the audio performance.

In variations on this fourth embodiment, such as in charity situations where the callers 22 are not required to donate any set amount, the message to the service provider 12 indicating confirmation of receipt of payment by a caller 22 may be omitted. In this manner, the service(s) provided by the service provider 12 are not interrupted by confirmation of the ad-hoc payments received from callers 22.

It should be appreciated by the person skilled in the art that the above invention is not limited to the embodiments described. In particular, the following modifications and improvements may be made without departing from the scope of the present invention:

- the web server 16 and call centre server 14 may in fact be a cluster of servers. Similarly, the service provider database 18 and caller database 20 may in fact be tables of records forming part of a unitary database.
- the web server 16 may be integrated into the call centre server 14.

the service provider's 12 unique identifier may be numeric or alphanumeric. In its alphanumeric form, letters may be represented as multiple quick succession depresses of numeric keys on the telephone as would be known to the person skilled in the art. Yet alternative methods of representing both numeric and alphanumeric unique identifiers are considered to be well within the skills of the person skilled in the art.

The service provider database 18 and the caller database 20 may be separately or collectively integrated into either the web server 16 or the call centre server 14.

The service provider 12 may be requested as part of the "blog" form 38 to provide other items such as images, video or sound files that may be included as part of the service provider's 12 information page 56. The service provider 12 may also be prompted to provide links to other websites which will also be included as part of the service provider's 12 information page 56.

In alternative configurations, a contact number provided by a service provider 12 may be a PABX which can then forward the relaying and farming of calls to the appropriate person within the service provider. In yet further alternatives, the contact number may be any electronic voice communication device. In this manner, communication may be facilitated through Voice Over Internet Protocol, or like, services.

Activation of a service provider's 12 account may be facilitated by way of a text message in place of a telephone call. However, the content of the activation message delivered will not change regardless of the method used to convey that message.

The call centre system 10 may provide web publishing tools that allow the service provider 12 to modify their template personal information page 56.

Access controls may be implemented as part of the call centre system 10 by requiring the caller 22 to also enter in other details as part of the registration process. For example, if the caller 22 is not of a certain age, the caller may be prevented from calling service providers 12 who provide certain types of calls or topics.

The call centre system 10 may be further customizable by the service provider 12 to allow for a simultaneous phone call and video broadcast by way of the service provider's personal information page 56.

In variations of the second embodiment, service providers 12 may also be able to rate callers 22. This rating information can then be provided to future service providers 12 before deciding whether to accept a call from that caller.

Service providers 12 may be able to block calls from certain callers 22.

In yet a further variation of the second embodiment, callers 22 may be provided with a unique feedback code at the end of their call to a service provider 12. This caller 22 can then access the website 28 and enter a feedback section thereof where feedback can be left by reference to the unique feedback code. The caller 22 may be reminded to leave feedback when they next access their account, if feedback is not immediately left.

The service provider 12 is not limited from advertising their unique code for the call centre system 10 to callers 22 through the website 28.

The caller 22 may also adopt an alias. In such circumstances, communication between the caller 22 and the service provider 12 may refer to the caller by the alias. Where the alias is also the reference used by the electronic payment facility, the caller 22 also need not give their legal name (which is otherwise required when dealing with credit cards).

In another alternative system, the caller database 20 may not be required. In its place, the caller 22 provides pre-call information, including their name and payment facility details, before being placed in contact with their requested service provider 12.

The credit card payment system and electronic payment system may be replaced with a pre-paid card system as is presently used in some countries to pay for mobile telephone calls.

The caller 22 may be able to bypass the interactive voice message requesting the unique identifier of the service provider 12 they wish to speak to, by calling a short code or area code with the unique identifier of said service provider 12 as a suffix thereto. In this case, the phone line assigned the short code would replace the dedicated phone line referred to above.

The system may flag callers 22 or service providers 12 who have a positive feedback rating below a pre-determined amount for review by another system or operator to determine whether the caller's 22 account or service provider's 12 account should be de-activated.

E-mail message 48 may be replaced with a voice message or alternative text message (such as an SMS message). In such instances, the information conveyed does not change.

Phone call 52 may be replaced with a text message. Again, in this instance the information conveyed does not change.

If the system 10 is not able to contact a service provider 12 using their designated contact numbers, the system may operate to send a message to the service provider 12 using non-voice techniques. For instance, a message may be sent to the service provider 12 by way of their e-mail address, SMS or pager. The message will inform the service provider 12 that they have a call from a caller 22 and that they can access this call by phoning a set phone number and entering in the unique number included as part of the message. Once the service provider 12 calls the number and enters the unique number, they will then be processed as if the initial linking call 62 was successful in contacting the service provider 12.

The interrupt payment system 100 may form one single executable program or may be a series of programs working in concert. Similarly, the interrupt payment system 100 may be stored and operational on a server separate to the call centre server 14.

In further variations on the fourth embodiment of the system, rather than receiving the audio performance over the linked call 62, the caller 22 may receive instructions and/or the codes necessary to access the service through an alternate medium. Similarly, the initial communication may be by way of video call rather than pure audio call, in this instance the service may be provided using multimedia techniques and not simply via audio. As an extension of this alternative, if the linked call 62 is made using combination phone/fax lines, it is possible to provide the service using facsimile by creating a further interrupt of the linked call 62 after payment in order to send/receive the facsimile.

Other codes, menu options and error processing beyond that described in the embodiments may be used without substantially affecting the functionality of the system.

The interrupt payment system 100 may be operable to receive information from the caller 22 and/or service provider 12 using techniques other than DTMF recognition. For instance, a voice recognition system may be used to obtain the information.

The playing of voice messages on receipt of the confirmatory signals for payment may be omitted.

The service provider 12 may be credited with the full amount paid by the caller 22 rather than the reduced amount. In its place, the service provider 12 may be billed separately by the operator of the system for the commissions and/or service charges applicable for a predetermined time period.

E-mail messages 64, 66 may be omitted. Alternatively, the interrupt payment system 100 may provide further processing such that e-mail messages 64 and 66 also include in the determination of the expected cost of the call the amounts processed by the interrupt payment system 100.

The system may be further modified to omit the call charge to be paid by the caller 22. In such a situation, it is expected that amounts received by way of the interrupt payment system 100 will cover any call charges levied by the operator of the system.

The interrupt payment system 100 may provide a refund mechanism. The refund mechanism would operate in an identical manner to that described in the first embodiment of the invention, but with the roles of service provider 12 and caller 22 reversed.

The service provider 12 may provide for payment received via the interrupt payment system 100 or for the call-charges to be credited to an account other than a bank account. For instance, payment may be made to the service provider's mobile phone account or an electronic payment account such as PayPal™.

There is no requirement under this system for the service provider 12 to be "live" in the provision of the service. Once a price has been determined, the service may, for example, take the form of a pre-recorded message.

Rather than receiving a completely impersonal automated voice message, automated messages may, during setup of a caller or service provider's account, record the caller or service provider, as appropriate, saying their name. This voice recording can then be included by the interrupt payment system 100 and/or the call centre system 10 as part of a voice message delivered to the caller or service provider as appropriate.

Calls to the call centre system 10 may be initiated directly from the website or via a computer program as Voice Over Internet Protocol (VOIP) calls. The system need not be limited to VOIP calls, however, as other methods of providing voice communication over a computer network may also be used in initiating such calls.

The feedback mechanism may be routed through a service provider or caller's account. In this manner, when a caller or service provider logs onto the system there will be a list of service providers/callers that have not been rated and the caller/service provider will be asked if they wish to rate such people then and there.

Alternatively, the feedback mechanism may be handled via text messages. In this arrangement, upon termination of a call, both the caller and service provider are sent text messages to their text-enabled mobile phones. Their replies to such messages then constitute the feedback. In its most preferable format, such replies consist of a numeric rating at the commencement of the reply message and feedback text trailing thereafter.

The system may be further modified to provide for speed dialing. In this situation, the caller may simply enter one or two digit codes upon calling a main line and they will immediately be patched through to the associated service provider.

In a further alternate configuration the interrupt payment system may actually function as two separate PABXs. The first PABX operates to receive calls and the other operates to place calls to service providers. This configuration provides for an easier way to allow the system to identify which party has triggered the interrupt payment system.

The method of suspending and resuming a linking call may be way of a "hold" function. However, alternative methods that have the same effect can be used and should be considered within the scope of the invention.

The system may be further modified such that a service provider 12 has there own dedicated call centre server 14 running the interrupt payment system 100. In this manner, the call centre server 14 need not be linked to multiple service providers 12. This arrangement would also allow payment information in respect of the service provider 12 to be fixed within the programming of the interrupt payment system 100.

The amount requested by the service provider 12 may be a net amount. In this situation, the interrupt payment system 100 may operate to calculate a grossed-up amount inclusive of its commission charges and any applicable taxes and request this grossed-up amount from the caller.

In a variation of the system, a variety of DTMF signals or signal combinations may be used as the interrupt signal. In a further variant, a plurality of DTMF signals, or signal combinations, may act as the interrupt signal with each such signal or signal combination also representing a fixed payment to be made to a particular party to the call. Such a system will still act as an interrupt (as the service provider will want to confirm receipt of payment before providing such service) and checks will need to be put in place to ensure that the service provider does not trigger a signal or signal combination that automatically makes payment from the caller's account to himself without appropriate authorization from the caller. However, in all other aspects the system would operate as described above.

It should be further appreciated by the person skilled in the art that the features described above, where not mutually exclusive, can be combined to form yet further embodiments of the invention.

I claim:

1. An interrupt payment system comprising:
   means for detecting an interrupt signal generated by a party to an established call, the interrupt signal being communicated by way of the established call;
   means for obtaining details of a payment to be made to a party providing a service on detection of the interrupt signal;
   a payment processor operable to process the payment in accordance with the obtained details and forward the payment to the party providing the service; and
   means for resuming the established call between all parties concerned on processing of the payment by the payment processor.

2. An interrupt payment system according to claim 1, where the party that generated the interrupt payment signal is the party providing the service.

3. An interrupt payment system according to claim 1 or claim 2, where the means for obtaining details of a payment to be made to another party includes a voice response system to guide the party who generated the interrupt signal through the process of making payment to another party to the established call.

4. An interrupt payment system according to claim 1 or claim 2, where the means for obtaining details of a payment, determines the amount of the payment from the particular interrupt signal generated.

5. An interrupt payment system according to any preceding claim, further including means for confirming processing of payment to the party providing the service.

6. An interrupt payment system according to any preceding claim, further including means for confirming receipt of payment to the party providing the service.

7. An interrupt payment system according to claim 5 as dependent on claim 3, where the means for confirming processing forms part of the voice response system.

8. An interrupt payment system according to claim 6 as dependent on claim 3, where the means for confirming receipt forms part of the voice response system.

9. An interrupt payment system according to any preceding claim for use with a call-centre system having payment details recorded for the party making the payment and the party providing the service, the means for obtaining details of a payment to be made operable to obtain these details and pass them to the payment processor to facilitate payment.

10. An interrupt payment system according to any preceding claim, where the payment received by the party providing the service is reduced by a commission payable to a system operator, and the amount represented by such commission is paid to the system operator.

11. An interrupt payment system according to any preceding claim, where the amount paid by the party making the payment is a grossed-up calculation of the amount specified in the payment details and the amount paid to the party providing the service is the net amount specified in the payment details.

12. An interrupt payment system according to any preceding claim where the party making payment receives a service, in whole or in part, or instructions on how to access a service, following resumption of the established call.

13. An interrupt payment system according to any preceding claim, where the established call is one of the following: a telephone call; a video call having voice capabilities; a voice-over-internet protocol call; or website or computer program initiated voice call.

14. A method of making a payment comprising the steps of:
   detecting an interrupt signal generated by a party to an established call, the interrupt signal begin communicated by way of the established call;
   obtaining details of a payment to be made to a party providing a service on detection of the interrupt signal;
   processing the payment in accordance with the obtained details and forwarding the payment to the party providing the service; and
   resuming the established call between all parties concerned on processing of the payment.

15. A method of making a payment according to claim 14, further including the step of confirming the processing of the payment with the party making the payment.

16. A method of making a payment according to claim 14 or claim 15, further including the step of confirming the receipt of the payment with the party providing the service.

17. A method of making a payment according to any one of claims 14 to 16, where the step of obtaining details of a payment to be made on detection of the interrupt signal includes the sub-step of obtaining at least part of the details of payment from a call centre system having payment details recorded for the party making the payment and the party providing the service.

18. A method of making a payment according to any one of claims 14 to 17, further including the step of paying a commission amount to the system operator from the payment made.

19. A method of making a payment according to any one of claims 14 to 18, further including the step of calculating a grossed-up payment amount from the payment details, the payment to be made by the person making the payment being the grossed-up payment amount.

20. A method of making a payment according to any one of claims 14 to 19, further comprising the step of delivering a service, at least in part, by way of the established call on resumption of the established call.

21. An interrupt payment server comprising:
means for detecting an interrupt signal generated by a party to an established call, the interrupt signal being communicated by way of the established call;
means for obtaining details of a payment to be made to a party providing a service on detection of the interrupt signal;
a payment processor operable to process the payment in accordance with the obtained details and forward the payment to the party providing the service; and
means for resuming the established call between all parties concerned on processing of a payment by the payment processor.

22. An interrupt payment server according to claim 21, where the means for obtaining details of a payment to be made to another party includes a voice response system to guide the party who generated the interrupt signal through the process of making payment to another party to the established call.

23. An interrupt payment server according to claim 21 or claim 22, further operable to confirm processing of payment to the party making the payment.

24. An interrupt payment server according to any one of claims 21 to 23, further operable to confirm receipt of payment to the party providing the service.

25. An interrupt payment server according to any one of claims 21 to 24, where the interrupt payment system is in communication with a call centre system, the call centre system having payment details recorded for the party making the payment and the party providing the service, the means for obtaining payment details of a payment to be made operable to obtain these details and pass them to the payment processor to facilitate payment.

26. An interrupt payment system according to any one of claims 21 to 25, including service delivery means to deliver a service, at least in part, by way of the established call on resumption of the established call.

27. A non-transitory computer-readable medium having software recorded thereon, the software on execution operable to:
detect an interrupt signal generated by a party to an established call, the interrupt signal being communicated by way of the established call;
obtain details of a payment to be made to a party providing a service on detection of the interrupt signal;
process the payment in accordance with the obtained details and forward the payment to the party providing the service; and
resume the established call between all parties concerned on processing of a payment by the payment processor.

* * * * *